(12) United States Patent
Suzuki

(10) Patent No.: US 8,654,379 B2
(45) Date of Patent: Feb. 18, 2014

(54) DATA PROCESSING APPARATUS AND RECORDING MEDIUM

(75) Inventor: Katsunori Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 575 days.

(21) Appl. No.: 12/784,818

(22) Filed: May 21, 2010

(65) Prior Publication Data

US 2010/0315672 A1 Dec. 16, 2010

(30) Foreign Application Priority Data

Jun. 16, 2009 (JP) ................................ 2009-143161

(51) Int. Cl.
 *G06F 3/12* (2006.01)
(52) U.S. Cl.
 USPC .......... 358/1.15; 358/1.13; 358/1.9; 358/3.23
(58) Field of Classification Search
 USPC ............... 358/1.13, 1.15, 1.1, 1.9, 1.14, 1.16, 358/3.23, 401, 402
 See application file for complete search history.

(56) References Cited

U.S. PATENT DOCUMENTS

| 6,943,905 | B2 * | 9/2005 | Ferlitsch ..................... 358/1.13 |
| 7,046,385 | B2 * | 5/2006 | Mori et al. ................... 358/1.15 |
| 2007/0171467 | A1 * | 7/2007 | Mokuya et al. ............. 358/1.15 |
| 2008/0222522 | A1 * | 9/2008 | Morales ....................... 715/276 |
| 2009/0147302 | A1 * | 6/2009 | Yang ............................ 358/1.15 |
| 2010/0134818 | A1 | 6/2010 | Minamizono et al. | |

FOREIGN PATENT DOCUMENTS

| JP | 2003-140867 | 5/2003 |
| JP | 2006-178654 | 7/2006 |
| JP | 2006-209430 | 8/2006 |

OTHER PUBLICATIONS

U.S. Appl. No. 12/793,084, filed Jun. 3, 2010, Suzuki.
U.S. Appl. No. 12/823,708, filed Jun. 25, 2010, Suzuki.
"Chenjirou", Ricoh Company, Ltd., Product information, office equipment, digital printer, Priport series, PC Controller (retrieved on May 22, 2009), internet. <URL;http//www.ricoh.co.jp/opp/priport/option/control/change_ro/> with Partial English Translation.
"Ridoc IO DataSelector Version 4.4", Ricoh Company, Ltd., Product information, office equipment, printer, Printer Solution (retrieved May 22, 2009), internet. <URL;http://www.ricoh.co.jp/IPSiO/related_goods/dataselector/> with Partial English Translation.
Office Action issued Mar. 5, 2013 in Japanese Patent Application No. 2009-143161.

\* cited by examiner

*Primary Examiner* — Vu B Hang
(74) *Attorney, Agent, or Firm* — Oblon, Spivak, McClelland, Maier & Neustadt, L.L.P.

(57) ABSTRACT

A data processing apparatus includes a virtual printer driver unit configured to receive job data of a job from an application executing unit, generate image data based on the job data, and generate print setting data by describing a print setting extracted from the job data; an output condition control unit configured to rewrite the image data and the print setting data generated by the virtual printer driver unit and determine an output destination from which the image data is to be printed out, in accordance with a rule including conditions for selecting the output destination and making a change in output contents of the job; and a transmission unit configured to select a printer driver corresponding to the determined output destination and transmit, to the selected printer driver, a print command relevant to a changed job corresponding to the image data and the print setting data that have been rewritten.

16 Claims, 11 Drawing Sheets

;ASSOCIATION OF CONDITIONS AND SETTING
[Command]
Condition1 = Setting1
Condition2 = Setting2

;SETTING CONDITIONS
[Condition1]
UserName = UserA
NumberOfPages >= 2

[Condition2]
PCName = ClientA
IncludeString = Confidential

;SETTINGS
[Setting1]
Duplex = yes
Color = no
Printer = Printer A

[Setting2]
Message = "Warning! Confidential Document"
Printer = Printer B

;ASSOCIATION OF CONDITIONS AND SETTING
[Command]
Condition3 = Setting3
Condition4 = Setting4

;SETTING CONDITIONS
[Condition3]
DocumentName = doc_cover

[Condition4]
DocumentName = doc_body

;SETTINGS
[Setting3]
Backup (backuplocationA)
Printer = Null

[Setting4]
Merge (backuplocationA, [doc_cover])
Printer = Printer B
<=======
```

;Confidential keyword
"Confidential"
"For internal use only"
"Confidential"
"Classified"
      :

| USER NAME | NUMBER OF PRINTOUTS IN PAST MONTH | |
| --- | --- | --- |
| | COLOR | MONOCHROME |
| UserA | 52 | 135 |
| UserB | 12 | 274 |
| UserC | 3 | 55 |

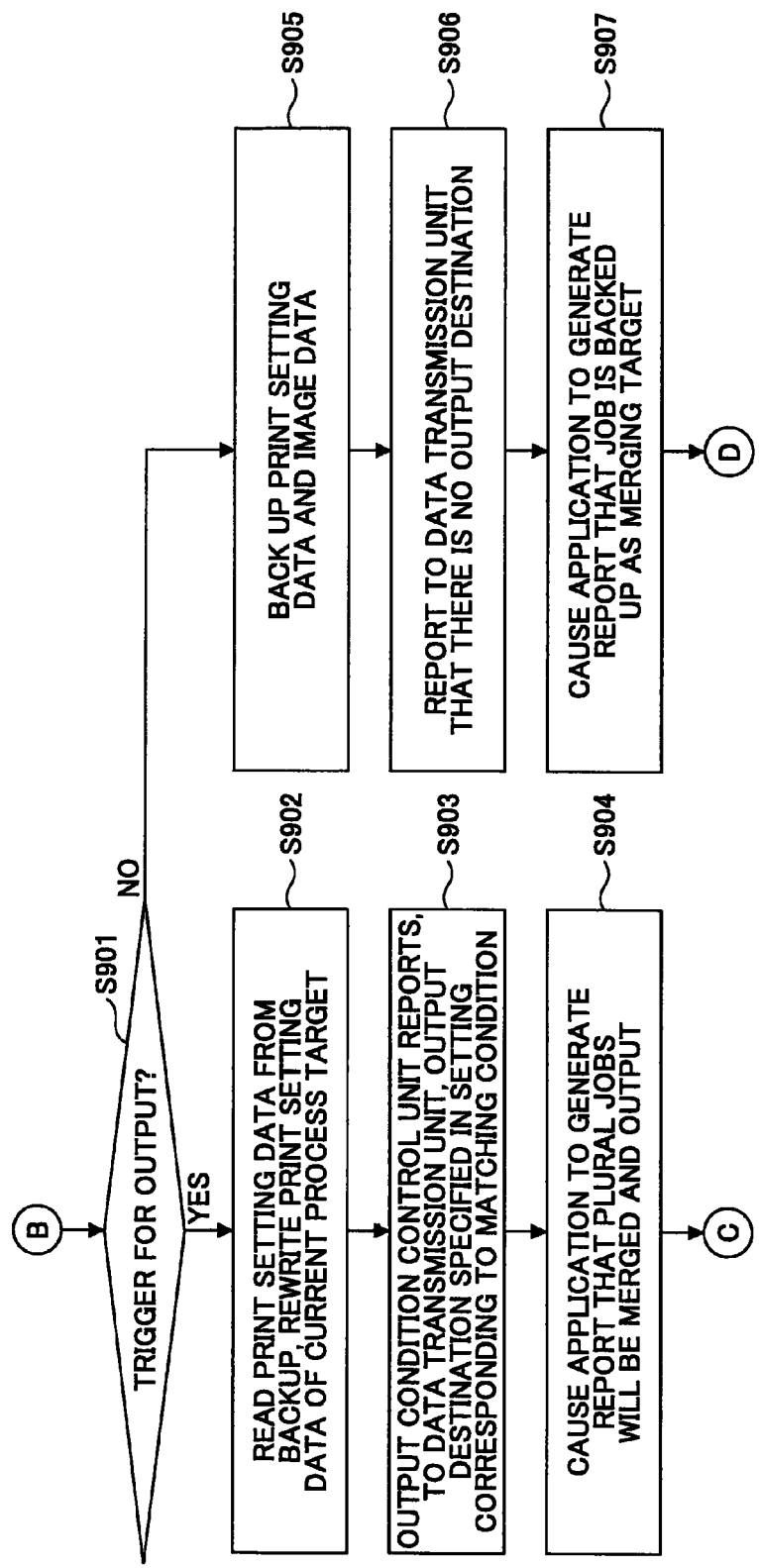

FIG.10A

<SUGGESTION TO CHANGE PRINT SETTING>

COLOR PRINTING IS SPECIFIED, BUT DO YOU APPROVE
OF MONOCHROME PRINTING?

| YES | NO |

FIG.10B

<REPORT OF MERGED PRINTING>

DOCUMENT (doc_cover_20090529) HAS BEEN BACKED UP.
THIS DOCUMENT WILL BE MERGED WITH PREDETERMINED
TEXT AND MERGED DOCUMENTS WILL BE OUTPUT.

| OK |

FIG.10C

<REPORT OF MERGED PRINTING>

DOCUMENT (doc_cover_20090529) AND DOCUMENT
(doc_body_20090529) HAVE BEEN MERGED AND OUTPUT.

| OK |

DATA PROCESSING APPARATUS AND RECORDING MEDIUM

BACKGROUND OF THE INVENTION

1. Field of the Invention

The present invention relates to a data processing apparatus and a recording medium relevant to data processing techniques used in printing operations.

2. Description of the Related Art

In recent years and continuing, network technology is becoming pervasive, and information security is gaining increasing attention.

Accordingly, so called thin client environments are becoming pervasive in office environments such as companies, hospitals, inspection institutes, and government offices. In a thin client environment, a client terminal, which is provided with minimum functions, is remotely connected to a server via a network. Applications of the server can be used by a client terminal via the network.

In office environments, MFPs (Multi-Function Peripherals), laser printers, and printer servers are connected to a network, such that plural output devices are available for use. However, in an environment where plural output devices can be used from plural locations, the following problem may arise. That is, when a user selects an output destination from among plural printers on a network, the user may erroneously specify the wrong output destination. In particular, when handling personal information and/or confidential information, if the wrong output destination is erroneously specified to output such documents, serious problems may occur such as information leakage.

Furthermore, in relation to assigning output destinations, there is demand for automatically switching the output destination in accordance with the type of form, document, or document contents. In order to respond to such demand, there is software for automatically switching the output device according to the number of printouts in a Windows (registered trademark) environment, so that the document is output from an optimum output device (non-patent document 1). Furthermore, there is a technology for analyzing print data, detecting a particular keyword in the document, determining the type of form or document as well as the security level, and printing out the document upon automatically switching the output conditions (non-patent document 2).

Furthermore, patent document 1 proposes a technology of managing the output destinations of documents. Specifically, the printer for outputting a document is automatically assigned in accordance with the statuses of the printers, such as "out of paper".

As described above, various technologies have been provided for assigning the output destination by automatically selecting an output device from among plural output devices that are available for use. However, the conventional technology is only capable of assigning the output destination. There is demand for developing a technology to flexibly control output conditions by incorporating print settings and other contents in the output conditions, in addition to the output destination. A distributed printing system according to the conventional technology only supports a particular printer language, or only supports printers of a particular manufacturer. Thus, there have been problems when such a distributed printing system is used in an office environment having printers of plural manufactures.

Patent Document 1: Japanese Laid-Open Patent Application No. 2003-140867

Non-patent document 1: "CHENJIROU", [online], Ricoh Company, Ltd., Product information, office equipment, digital printer, Priport series, PC Controller [retrieved on May, 22, 2009], Internet <URL;http://www.ricoh.co.jp/opp/priport/option/control/change_ro/>

Non-patent document 2: "Ridoc IO DataSelector Version4.4", [online], Ricoh Company, Ltd., Product information, office equipment, printer, Printing Solution [retrieved on May, 22, 2009], Internet <URL;http://www.ricoh.co.jp/IPSiO/related_goods/datas elector/>

SUMMARY OF THE INVENTION

The present invention provides a data processing apparatus and a recording medium in which one or more of the above-described disadvantages are eliminated.

A preferred embodiment of the present invention provides a data processing apparatus and a recording medium for changing and determining the output destination as well as the output contents in accordance with conditions defined for information pertaining to terminals and print jobs, and for outputting the data from an image forming apparatus corresponding to the determined output destination, regardless of whether the environment includes printers provided from different vendors or from the same vendor.

According to an aspect of the present invention, there is provided a data processing apparatus including a virtual printer driver unit configured to receive job data of a job from an application executing unit, generate image data based on the job data, and generate print setting data by describing a print setting extracted from the job data; an output condition control unit configured to rewrite the image data and the print setting data generated by the virtual printer driver unit and determine an output destination from which the image data is to be printed out, in accordance with a rule including conditions for selecting the output destination and making a change in output contents of the job; and a transmission unit configured to select a printer driver corresponding to the determined output destination, and transmit, to the selected printer driver, a print command relevant to a changed job corresponding to the image data and the print setting data that have been rewritten.

According to an aspect of the present invention, there is provided a computer-readable recording medium recording a program that causes a computer to function as a virtual printer driver unit configured to receive job data of a job from an application executing unit, generate image data based on the job data, and generate print setting data by describing a print setting extracted from the job data; an output condition control unit configured to rewrite the image data and the print setting data generated by the virtual printer driver unit and determine an output destination from which the image data is to be printed out, in accordance with a rule including conditions for selecting the output destination and making a change in output contents of the job; and a transmission unit configured to select a printer driver corresponding to the determined output destination, and transmit, to the selected printer driver, a print command relevant to a changed job corresponding to the image data and the print setting data that have been rewritten.

According to an aspect of the present invention, there is provided a data processing apparatus and a recording medium capable of changing the output destination and output contents, and sending a print command to an appropriate output destination, which are performed in accordance with a predetermined rule, thus improving the efficiency of operations in an office environment provided with plural output apparatuses.

BRIEF DESCRIPTION OF THE DRAWINGS

Other objects, features and advantages of the present invention will become more apparent from the following detailed description when read in conjunction with the accompanying drawings, in which:

FIG. 5 illustrates an example of rule definition data;

FIGS. 6A through 6C illustrate other examples of data used for determining output conditions by an output condition control unit according to the present embodiment;

FIG. 9 is a flowchart (part 2) of a process performed by the data processing apparatus according to the other embodiment; and FIGS. 10A through 10C illustrate GUI messages that are displayed on a screen page of a client in response to a user query made by the data processing apparatus.

DETAILED DESCRIPTION OF THE PREFERRED EMBODIMENTS

A description is given, with reference to the accompanying drawings, of embodiments of the present invention.

Figure 1:
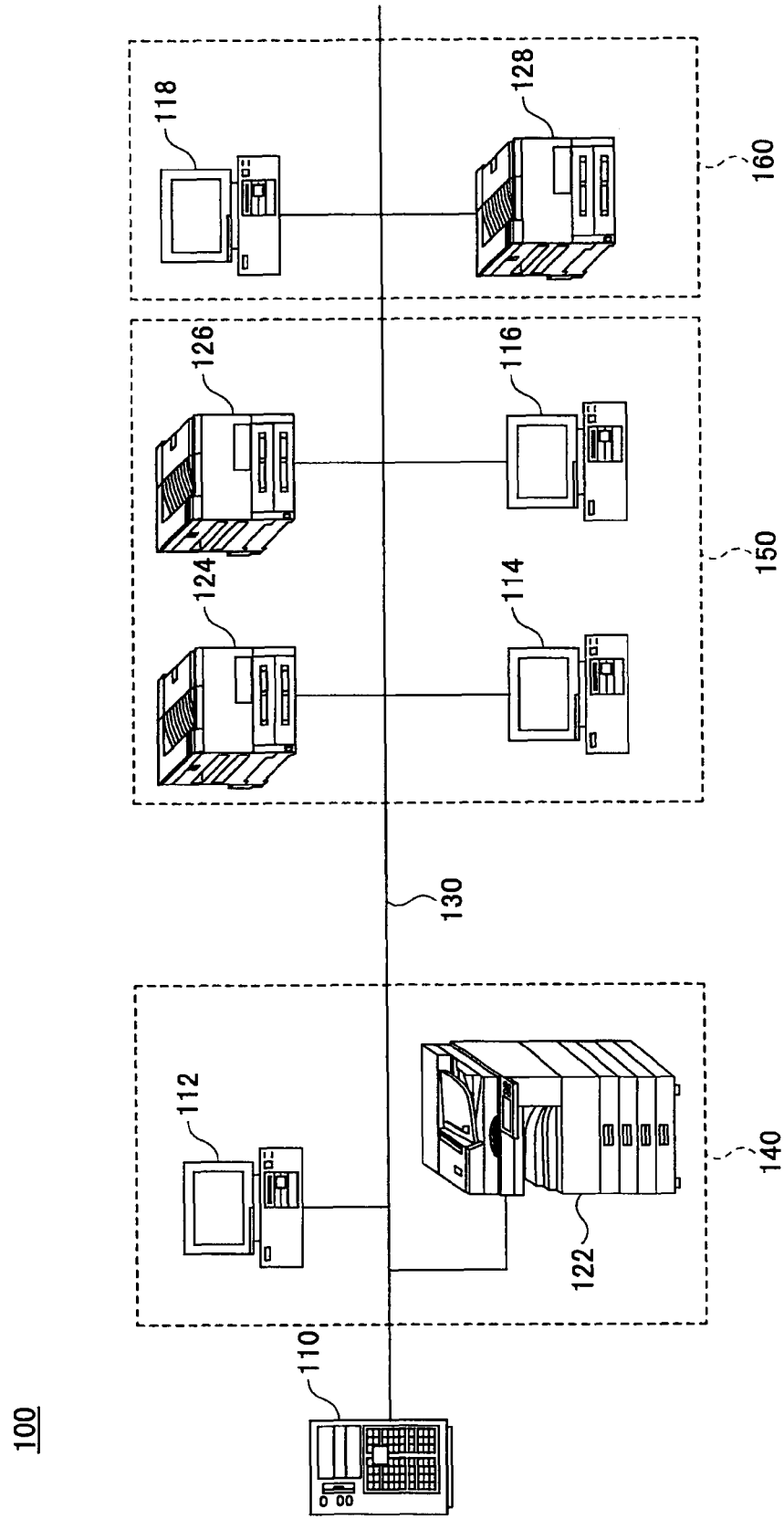
FIG. 1 illustrates a printer network including a data processing apparatus according to an embodiment of the present invention.

FIG. 1 illustrates a printer network 100 including a data processing apparatus 110 according to an embodiment of the present invention. The printer network 100 includes plural clients 112, 114, 116, and 118 located in offices, which are connected to a network 130. The data processing apparatus 110 is also connected to the network 130. In addition to the data processing apparatus 110, a printer server (not shown) may also be connected to the network 130, and the printer server may manage print requests from the clients 112, 114, 116, and 118.

The printer network 100 according to the present embodiment shown in FIG. 1 also includes a multifunction peripheral (MFP) 122, laser printers 124 and 126, and an inkjet printer 128, which are connected as remote printers. In the present embodiment, the MFP 122, the laser printers 124 and 126, and the inkjet printer 128 are collectively referred as remote printers. In FIG. 1, the regions surrounded by dashed lines express that elements included in the regions are respectively disposed at the same locations 140, 150, and 160.

In the embodiment shown in FIG. 1, the data processing apparatus 110 acquires print requests and print data corresponding to the print requests from the clients 112, 114, 116, and 118, changes the output contents in accordance with various conditions, determines the remote printer that is an appropriate output destination, and activates a printer driver corresponding to the remote printer. Then, the data processing apparatus 110 sends data in a format processable by the output destination, i.e., RAW data corresponding to the print data, to the determined remote printer. The created RAW data is converted to output data by undergoing a process of adding a PDL (Page Description Language) command, and is sent to the specified remote printer 122, 124, 126, and 128. The remote printer 122, 124, 126, and 128 to be used as the output destination can be determined according to the client 112, 114, 116, and 118. Accordingly, the printing process can be executed with a remote printer that is at the same location as the client or a remote printer that is at a location near the client. In the embodiment shown in FIG. 1, the client 112 and the remote printer 122 are in the location 140. In the locations 150 and 160, clients and printers are associated with each other. There may be plural clients in each of the locations 140, 150, and 160, and there may be plural remote printers in each of the locations 140, 150, and 160. There may also be a location that only includes either a client or a remote printer.

The data processing apparatus 110 is preferably implemented as a server apparatus. The data processing apparatus 110 includes a single-core or multi-core CPU, a ROM, a RAM for providing an execution space, and a hard disk device. The data processing apparatus 110 controls the operations of changing the output contents of the print data and determining the output destination, under the control of an operating system (OS) such as Windows (registered trademark) 200x server, UNIX (registered trademark), LINUX (registered trademark), and Solaris (registered trademark). Transaction can be performed between the data processing apparatus 110 and the clients 112, 114, 116, and 118 with the use of an appropriate remote connection protocol such as RDP. Functions of the data processing apparatus 110 may be implemented as functions of the clients 112, 114, 116, and 118 if the clients 112, 114, 116, and 118 are implemented as fat clients.

In the present embodiment, when a printer server is connected to the printer network 100 to manage print requests, the data processing apparatus 110 creates print data in a format processable by the printer server, and sends the print data to the printer server. Then, the printer server sends print data in a RAW format to the remote printer 122, 124, 126, and 128 determined as the output destination, and causes the remote printer to execute a print job.

When a printer server is used, the printer server may have the same configuration as the data processing apparatus 110, in terms of the hardware configuration and the OS configuration.

The clients 112, 114, 116, and 118 have the same configurations, and are implemented as thin clients. A thin client only has a function of issuing a service request to the data processing apparatus 110 (making requests for services such as a network connection module, a user authentication function, and a session generating module), receiving a process result, and requesting print output. When implemented as thin clients, the clients 112, 114, 116, and 118 include a single-core or multi-core CPU, a RAM, a ROM, and a network interface card (NIC). After the clients 112, 114, 116, and 118 complete a process under the control of an appropriate operating system (OS) such as Windows (registered trademark), UNIX (registered trademark), LINUX (registered trademark), and Mac OS (registered trademark), the clients 112, 114, 116, and 118 issue a print request to the data processing apparatus 110.

In another embodiment, the clients 112, 114, 116, and 118 may be implemented as fat clients. Specifically, each of the clients 112, 114, 116, and 118 has application programs, and is configured as a personal computer or a workstation for executing various processes. The clients 112, 114, 116, and 118 implemented as fat clients load an application program and data from a hard disk device into a RAM, and cause the CPU to execute the application program. Accordingly, the clients 112, 114, 116, and 118 generate a document file, which is a target of a printing process, as electronic data including a document, images, multimedia, or a combination of these items, and requests the respective remote printers 122, 124, 126, and 128 to perform a print process.

The data processing apparatus 110 passes data, which has been created in accordance with a client's request, to a virtual printer driver, so that the selection of the output destination and/or the output contents can be changed for each job. For example, the output contents may be changed by merging jobs, changing various print settings of a job, or changing the contents in a page of a job. Details of changing the output contents according to the present embodiment are given below. Output conditions including changes in the output contents and the selection of the output destination are determined according to information of various conditions. Examples of information of various conditions are information unique to each terminal such as a client's MAC address (Media Access Control Address) or an IP address (Internet Protocol Address), information unique to each user such as a log-in user name and a user right, print setting information of a job, and job content information indicating a document name, the number of pages, and whether there is a confidential keyword. The created output data is sent to a remote printer corresponding to the determined output destination to execute the print process. Details of a virtual printer driver are given below.

The network 130 may be an Ethernet (registered trademark) such as 1000Base-TX, an optical network, or a wireless network having an IEEE 802.11 specification. The network 130 performs packet communication based on frames or the TPC/IP protocol. The network 130 may be a LAN or a wide area network that is built in a secure environment, such as a VPN (Virtual Private Network).

Figure 2:
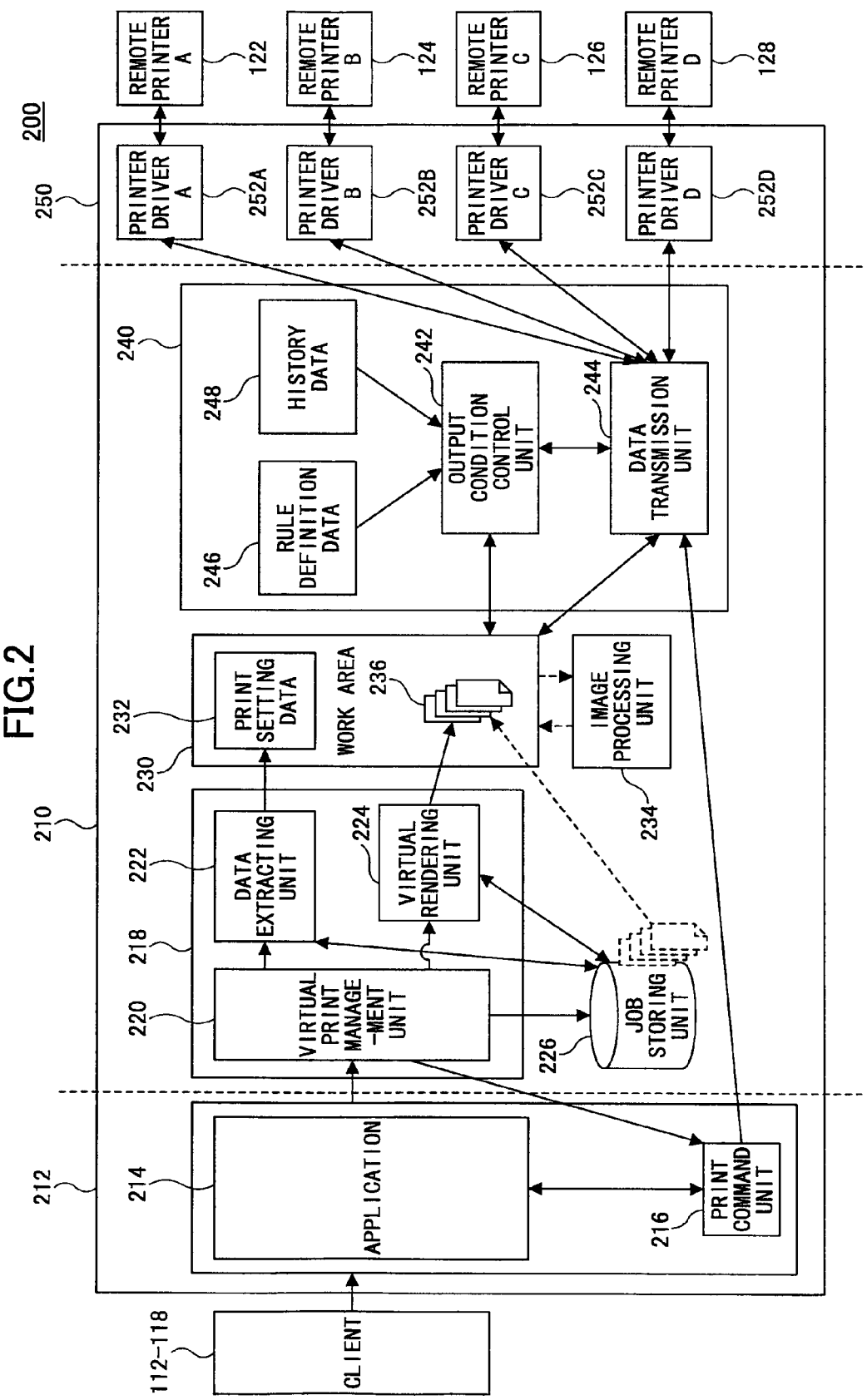
FIG. 2 is a functional block diagram of the data processing apparatus according to the present embodiment.

FIG. 2 illustrates a functional block 200 of the data processing apparatus 110 according to the present embodiment. As shown in FIG. 2, the data processing apparatus 110 includes plural functions, which are implemented in a computer by loading a program in a RAM and executing the program under the control of a CPU.

As shown in FIG. 2, the data processing apparatus 110 includes a data processing unit 210, an application executing unit 212, and a print processing unit 250. The data processing unit 210, the application executing unit 212, and the print processing unit 250 of the data processing apparatus 110 may be implemented as a single unit as shown in FIG. 2. However, in other embodiments, these functions shown in FIG. 2 need not be implemented as illustrated in FIG. 2. These functions may be separated at one or both of the dashed lines corresponding to network boundaries. For example, the print processing unit 250 on the right side may be implemented as a print server, and the application executing unit 212 on the left side and the data processing unit 210 in the middle may be implemented as a terminal server separate from the print server. Alternatively, the print processing unit 250 on the right side and the data processing unit 210 in the middle may be implemented as a server, and the application executing unit 212 on the left side may be separately implemented as another server. Furthermore, the data processing unit 210, the application executing unit 212, and the print processing unit 250 may be implemented as separate servers.

In yet another embodiment, the functions of the data processing apparatus 110 may be implemented in the clients, such that the clients are implemented as fat clients. For example, each of the clients 112, 114, 116, and 118 may have the functions of the data processing unit 210, the application executing unit 212, and the print processing unit 250. Each of the clients 112, 114, 116, and 118 may have the functions of the application executing unit 212 and the data processing unit 210. Each of the clients 112, 114, 116, and 118 may only have the function of the application executing unit 212. The implementation format of the functions may be appropriately changed according to the environment in which the printer network 100 is installed or particular purposes of the user.

The application executing unit 212 receives a process request and a print request from the clients 112, 114, 116, and 118 via the network 130, executes a process, and creates an execution result. In response to a print command event generated by a print command unit 216, the execution result is turned into a print job (hereinafter, simply referred to as "job") according to an API call implemented by GDI. Then, the job data is sent to the data processing unit 210. The data processing unit 210 includes a virtual printer driver 218, a job storing unit 226, and a transmission processing unit 240. The job storing unit 226 temporarily stores the job data sent from an application 214 when the virtual printer driver 218 is called. The transmission processing unit 240 controls changes in the output destination and the output contents according to a predetermined rule, while sending the data to be printed to a printer driver 252 of one of the remote printers 122, 124, 126, and 128 that has been determined. In response to a call from the print command unit 216 implemented as a print command module of the application executing unit 212, the virtual printer driver 218 receives job data sent from the application 214, generates a process ID for uniquely identifying the job that has currently started, reports the process ID to the print command unit 216, and starts a process.

The print command unit 216 uses the received process ID as an argument to cause the transmission processing unit 240 to execute a process for determining output conditions and a transmission process for each job. The transmission processing unit 240 determines the output conditions including changes in the output contents and the selection of the output destination for each job. When the output conditions have been determined, the print command unit 216 acquires the data of a high order image format generated in a work area 230, and gives a print command to the printer driver 252 corresponding to the determined output destination.

In the present embodiment, the job process function of the data processing unit 210 is separated into the virtual printer driver 218 and the transmission processing unit 240, an instance of the transmission processing unit 240 is generated for each job, and a transmission process corresponding to the remote printer that is the transmission destination is executed in units of jobs. This minimizes the likelihood that the remote printer will stop operating due to an error. For this reason, in the present embodiment, separate instances of the transmission processing unit 240 are generated for each of the jobs. However, the present invention is not limited to generating separate instances of the transmission processing unit 240. For example, in another embodiment, a multithread (multitask) instance of the transmission processing unit 240 may be generated for performing a separate process for each job. The virtual printer driver 218 outputs print setting data and image data in a high order image format. Thus, a rendering process that is required due to differences in attributes and machine types is performed at a lattermost stage, so that the final printing quality is high. In the present embodiment, it is assumed that the virtual printer driver 218 and the transmission processing unit 240 are installed in the same computer; however, these elements may be separately installed in different computers, and may communicate with each other via a network.

As a result of the above-described process of the transmission processing unit 240, a failure that is caused due to an error of a particular remote printer can be limited to the job of the particular remote printer in which the error has occurred. Furthermore, the print command unit 216 is loaded in application processes in units of users. Therefore, the transmission processing unit 240 is activated with the use of the same right as the application process, and the appropriate notification and confirmation described below can be correctly implemented. Furthermore, in the present embodiment, the transmission processing unit 240 is activated with the same right as the application process, so that the transmission processing unit 240 can take over the right of the application that is displaying information for the print request source, and therefore the transmission processing unit 240 can display information for the print request source. This process can be done by any method as long as various information items can be displayed for the print request source. In another embodiment, instead of activating the transmission processing unit 240 with the same right as the application process, the thread ID of the print request source can be passed to the transmission processing unit 240, so that the transmission processing unit 240 can display information for the print request source. When the data processing apparatus 110 can receive input from a user to control the process, the print command unit 216 may issue a print command in response to receiving a mouse event.

In the present embodiment, the virtual printer driver 218 generates a process ID and reports the process ID to the print command unit 216, and then the print command unit 216 passes the process ID to the transmission processing unit 240 as the argument used for activation. However, the method is not particularly limited as long as a job can be uniquely identified by the virtual printer driver 218 and the transmission processing unit 240, and the data used in the process can be specified. In another embodiment, the process ID may be sent from the virtual printer driver 218 to the transmission processing unit 240.

In the present embodiment, the job data includes image data and job information data. The image data preferably includes high order image data including rendering codes such as EMF (Enhanced Metafile), PDF (Portable Document Format), PostScript (registered trademark), and XPS (XML paper Specification). However, the image data may include low order image data such as bitmap, JPEG, and GIF. In another embodiment, the image data may include both low order image data and high order image data. Furthermore, the image data is preferably in a format that is common to various printers, so that the process does not depend on a particular printer. The job information data includes an identifying value for uniquely identifying the source that issued the print request, image imposition information of image data, specification of the color mode, specification of combined printing, the margin, size setting, number of pages, and the document name. When the transmission processing unit 240 is activated with the same right as the application, the print request source is uniquely identified from the environment information associated with a log-in user of an application, and various associated information items can be acquired. Therefore, the identification value for uniquely identifying the request source does not necessarily need to be included in the job information data.

The virtual printer driver 218 includes a virtual print management unit 220, a job information data extracting unit 222, and a virtual rendering unit 224. When the job data is received, the virtual printer driver 218 calls the virtual print management unit 220 and stores the job data in the job storing unit 226. Meanwhile, the virtual print management unit 220 calls the virtual rendering unit 224, and the virtual rendering unit 224 reserves the work area 230 for associating image data included in job data stored in the job storing unit 226 with the job, and for processing the image data. The work area 230 may be provided as a storage area such as the HDD or the memory of the data processing apparatus 110, which can be accessed from the virtual printer driver 218 and the transmission processing unit 240. The work area 230 may be provided in a storage area such as a shared folder in another computer, which can be accessed from the virtual printer driver 218 and the transmission processing unit 240. The virtual print management unit 220 calls the job information data extracting unit 222, the job information data extracting unit 222 extracts job information data from job data temporarily stored in the job storing unit 226, and passes the job information data to the corresponding instance of the transmission processing unit 240. Therefore, print setting data 232 including contents of the job information data is stored in the work area 230. For example, in a Windows (registered trademark) system according to a particular embodiment, the print setting data 232 may be stored by having the print processor or the graphic module write in the contents of a print setting structure DEVMODE.

The virtual rendering unit 224 moves the image data included in the job data from the job storing unit 226 to the work area 230 in predetermine units, such as in units of pages, and generates image data in a high order image format in the work area 230. For example, in a Windows (registered trademark) system according to a particular embodiment, the image data can be moved by having the print processor divide an EMF file generated by the spooler in predetermined units and copy the EMF file into the work area 230, or by having the graphic module generate an EMF file in the work area 230 in units of pages. When the job storing unit 226 becomes empty, the virtual print management unit 220 sends a report that the image processing has ended to the application executing unit 212. The job data is preferably high order image data having a smaller volume than low order image data, so as to enhance the efficiency of processes performed by the job information data extracting unit 222 and the virtual rendering unit 224 and to reduce the RTA (Return to Application) time. The job information data that has been extracted/divided as described above is stored in the work area 230 as print setting data 232 that can be identified from a process ID. In the present embodiment, it is assumed that a file name of the print setting data 232 is uniquely obtained from the process ID, and the print setting data 232 of the job can be identified from the process ID by the virtual printer driver 218 and the transmission processing unit 240. However, in another embodiment, the process ID and the job information ID for identifying print setting data 232 may be managed in association with each other, to identify the print setting data 232 corresponding to the job.

In the present embodiment, the virtual rendering unit 224 writes, into the print setting data 232, the file names of image data 236 items that have been moved to the work area 230, in the order the image data 236 items have been moved. That is to say, for image data on each page, the file name, the print setting, and image imposition information of image data are written into the print setting data 232. Based on the file name of the image data 236 written in the print setting data 232, the image data 236 to be used for each job can be identified. In another embodiment, the process ID can be associated with an image ID of an image data 236 item, and the image data 236 corresponding to the process ID can be identified. Furthermore, as described above, the print setting data 232 can be accessed from plural function units, and therefore each of the operations of writing data into the print setting data 232 is preferably controlled (managed) exclusively.

When an image processing completion report is received, the application 214 cancels the exclusive management on the job storing unit 226, so that a subsequent print request can be processed. The exclusive management can be performed by various methods, such as semaphore and asynchronous class. In another embodiment, a GUI (Graphical User Interface), which provides the print command unit 216 of the application executing unit 212, may be changed to a format for not receiving events, and be displayed in the changed format. Accordingly, the exclusive control can be implemented in a simple manner.

The job storing unit 226 may be implemented as a storage area for storing a printer buffer of a spool file, depending on the type of embodiment of the data processing unit 210. The job storing unit 226 is not limited to a format of a particular OS. Furthermore, in another embodiment, the data processing unit 210 may include an image processing unit 234 for acquiring the image data 236 and print setting data 232 from the work area 230, and executing processes such as page allocation and image imposition. In this case, the image data 236 that has been moved to the work area 230 is acquired by the image processing unit 234 of the data processing unit 210.

In the present embodiment, the image processing unit 234 may be implemented as an image processing module such as a rendering module, which includes the printer driver 252 and a rendering processor. More specifically, in the case of high order image data including render control codes and vector images such as EMF, PDF, PostScript (registered trademark), and XPS, the image processing unit 234 can call the rendering processor and execute a process. Furthermore, when the image data that is a processing target is low order image data such as BMP, the image processing unit 234 calls the printer driver 252 and executes image conversion, and repeats the process using the work area 230 until an operation of creating a raster image from the image data 236 ends. Accordingly, output data in a RAW format is generated.

In the present embodiment, the image data 236 may include low order image data that does not include rendering codes, such as bitmap, JPEG, JPEG 2000, PNG, and GIF. Even when the image data 236 includes low order image data, the image processing unit 234 may generate the work area 230, and repeat the process using the work area 230 until the RAW data of the called printer driver 252 is generated. When a job includes both low order image data and high order image data, the process is executed by appropriately calling the rendering processor and the printer driver 252. After the image processing unit 234 has generated the output data, a data transmission unit 244 acquires the output data from the work area 230.

When the output destination is determined to be a specific remote printer, and the printer driver 252 of the determined remote printer has functions of page allocation and image imposition, the following processes are performed. Specifically, the image processing unit 234 performs image conversion on the generated image data 236 having a high order image format into a format that can be received by the printer driver 252. Furthermore, the image processing unit 234 specifies the print setting data 232 as the function setting value of the printer driver 252, to cause the printer driver 252 to convert the image data 236 into RAW data. For example, in one embodiment, almost all printer drivers of Windows (registered trademark) may receive EMF (Enhanced MetaFile) data, and therefore if the image data 236 were in the EMF format, there would be no need to convert the image data 236. By setting the print setting data 232 to a print setting structure DEVMODE, the printer driver 252 can create the intended RAW data. When the printer driver 252 does not have functions of page allocation and image imposition, the EMF data is divided in units of pages so that the page order may be rearranged and the rendering positions can be specified to achieve the intended RAW data.

A description is given of the transmission processing unit 240. The transmission processing unit 240 according to the present embodiment is generated as an instance for each job. More specifically, the transmission processing unit 240 includes an output condition control unit 242 and the data transmission unit 244. The data transmission unit 244 detects the print setting data 232 identified with a process ID, and uses the process ID or the file name of the print setting data 232 to query to the output condition control unit 242. The output condition control unit 242 refers to rule definition data 246 and history data 248 (or aggregate data obtained from history data) and determines the output conditions including the output destination and changes in the output content, in accordance with various information items for determining the conditions (information of conditions). The output condition control unit 242 identifies the print setting data 232 from the process ID or the file name, rewrites the print setting data 232 and the image data 236 in accordance with the determined output conditions, and determines the output contents. Subsequently, the output condition control unit 242 reports the determined output destination to the data transmission unit 244. The output condition control unit 242 is preferably provided as a plug-in module that can be incorporated in the transmission processing unit 240 according to a specific purpose.

In the rule definition data 246, the remote printer selected as the output destination and the changes in the output contents are defined as conditions. The rule definition data 246 is preferably provided as a file that can be defined by a user according to specific purposes. The history data 248 is configured as a database for managing job execution history executed by the user. For example, based on the history information, the number of color printouts in the past month is aggregated for each user, and the aggregate numbers are provided for determining the output conditions. Details of the operations executed by the output condition control unit 242 for controlling output conditions such as the output destination and changes in the output contents are given below. The rule definition data 246 and the history data 248 do not necessarily need to be held inside the transmission processing unit 240, as long as they can be appropriately accessed from the output condition control unit 242. For example, the rule definition data 246 and the history data 248 may be located anywhere they can be conveniently used, such as on a common file server that can be accessed by the administrator. According to this configuration, the rule definition data 246 may be provided as a common file in an environment where plural data processing apparatuses 110 are operating, thereby enhancing maintenance properties. Furthermore, by giving only the administrator the right to change the file of the rule definition data 246, security can be well maintained.

The data transmission unit 244 receives a report of the output destination from the output condition control unit 242, and sets the output destination. The data transmission unit 244 sends a print command to the printer driver 252 that is determined as the output destination. Specifically, the print command is to print out the image data 236 in a high order format in the work area 230, in accordance with the contents of the print setting data 232. The printer driver 252 that is determined as the output destination receives the print command, and sends output data in the RAW format to a port monitor. Thus, the remote printer determined as the output destination can print out the image data. The instance of the transmission processing unit 240, which is activated for each job, ends upon receiving a report that the printing has ended.

As described above, in the present embodiment, plural jobs can be merged and output. When it is determined that the output contents are to be changed by merging plural jobs, the output condition control unit 242 backs up the image data 236 and the print setting data 232 stored in the work area 230 into a storage area (not shown), so that the backed up job can be merged with a subsequent job and the merged jobs can be output. In this case, the output condition control unit 242 reports to the data transmission unit 244 that there is no output destination, and the data transmission unit 244 ends the process without performing the transmission process. Meanwhile, when a subsequent job is requested, and a condition for triggering merge/output is satisfied (such as all jobs to be merged are provided), the output condition control unit 242 moves the backed up image data to the work area 230, and rewrites the print setting data 232 of the subsequent job so that the backed up image data items are merged with the subsequent job in a specified order, and determines the output contents. Then, the output condition control unit 242 reports the determined output destination to the data transmission unit 244. The data transmission unit 244 sends a print command of the merged jobs to the printer driver 252 that is determined as the output destination. Specifically, the print command is to print out the merged jobs in accordance with the contents of the print setting data 232 that has been rewritten.

In the present embodiment, the application 214 sends a job that preferably includes high order image data to the virtual printer driver 218. By sending high order image data, the data amount per image can be reduced, particularly in the case of color images. Thus, the data processing unit 210 can accommodate more print requests. When the virtual printer driver 218 receives the data, the output destination is not yet determined. Thus, if data of a lower order with respect to the performance of the output destination is received, the performance of the output destination cannot be fully applied. Therefore, the virtual printer driver 218 is preferably reported to the application as having sufficiently high rendering performance.

Figure 3:
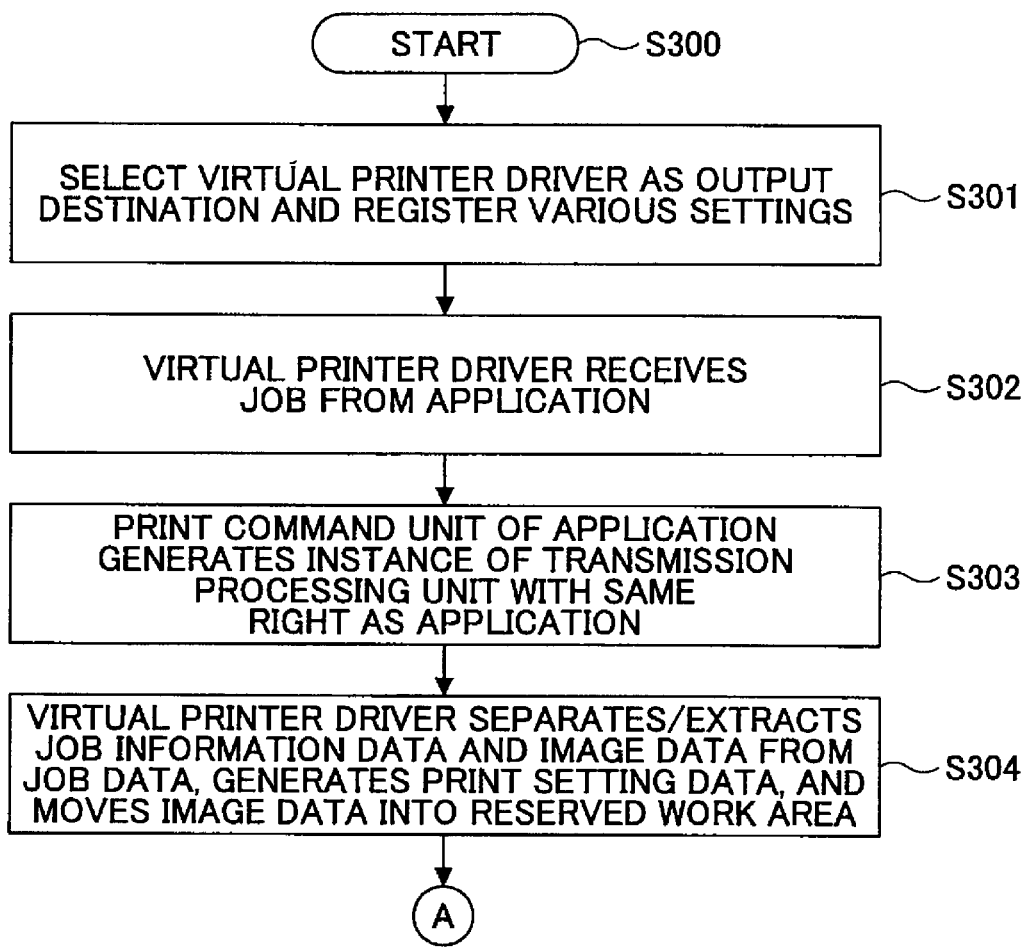
FIG. 3 is a flowchart (part 1) of a process executed by the data processing apparatus according to the present embodiment.
Figure 4:
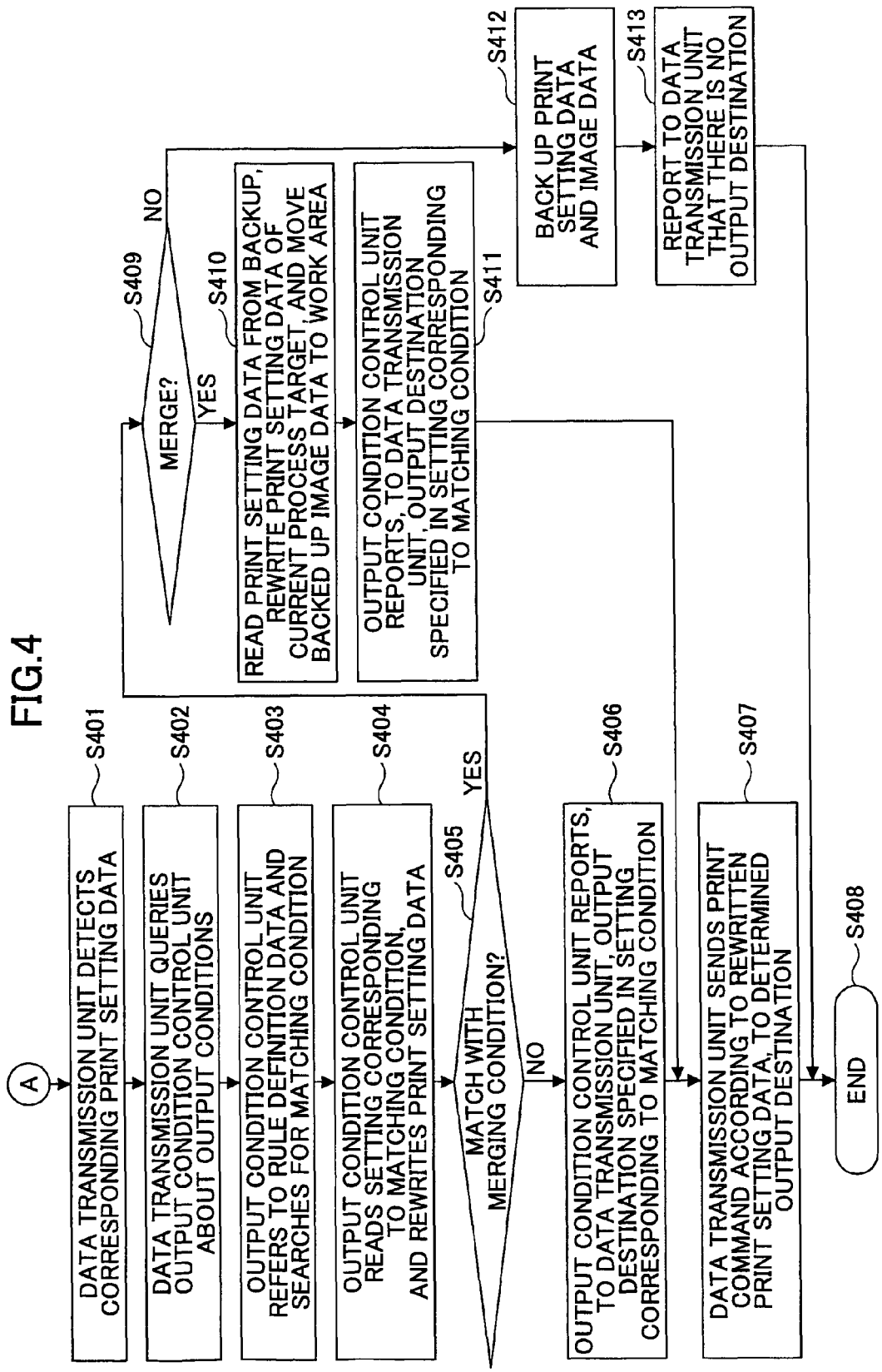
FIG. 4 is a flowchart (part 2) of a process executed by the data processing apparatus according to the present embodiment.

A detailed description is given of a process executed by the data processing apparatus 110 according to the present embodiment, with reference to flowcharts. FIGS. 3 and 4 are flowcharts of the process executed by the data processing apparatus 110 according to the present embodiment. FIGS. 3 and 4 are connected by point A. The process shown in FIGS. 3 and 4 starts at step S300. At step S301, the virtual printer driver 218 is selected, and various settings are registered. The registration can be done with a dedicated GUI (Graphical User Interface) by the administrator or the user of the data processing apparatus 110. In the embodiment shown in FIG. 2, the execution result is created by the application 214 according to a request from one of the clients 112, 114, 116, and 118, and the created execution result is passed to the virtual printer driver 218. In step S302, the virtual printer driver 218 receives the job from the application 214.

In step S303, the print command unit 216 generates an instance of the transmission processing unit 240 with the same right as the process of the application, and passes the process ID as an argument to the transmission processing unit 240. In step S304, the virtual printer driver 218 separates/extracts the job information data and the image data from the job data, generates the image data 236 in the work area 230 or moves the image data 236 into the work area 230, and generates the print setting data 232. More specifically, in step S304, the image data 236 that is stored in the job storing unit is moved to or generated in the work area 230 by the virtual rendering unit 224 in predetermined units such as in units of pages. At the same time, the virtual rendering unit 224 generates a print setting file, and writes in the file name of the image data of each unit. Meanwhile, the job information data extracting unit 222 writes the job information data into the print setting file in accordance with the print setting of the job information data that is separated/extracted from the job data.

After step S304, the process proceeds through point A to step S401 shown in FIG. 4. In step S401, the data transmission unit 244 of the transmission processing unit 240 activated in step S303 detects that print setting data 232, which is identified with a process ID received as an argument, has been generated in the work area 230, and starts the transmission process.

In step S402, the data transmission unit 244 queries the output condition control unit 242 about output conditions. The query can be made with the process ID or a file name of print setting data 232 obtained from the process ID. In step S403, the output condition control unit 242 acquires information of various conditions, refers to the rule definition data 246 to compare it with the information of various conditions, and searches for a matching condition. In step S404, the output condition control unit 242 reads the setting corresponding to the matching condition, and rewrites the print setting data 232. When there is a specification to change the contents of the image data in the setting corresponding to the matching condition, the image data is also changed.

In the following, a detailed description is given of a process of determining output conditions with reference to FIGS. 5 and 6. FIG. 5 illustrates an example of rule definition data. In the rule definition data shown in FIG. 5, various conditions are defined at [Condition1] and [Condition2], and various settings of changing the output contents are defined at [Setting1] and [Setting2]. At [Command], the above conditions and settings are associated with each other. In FIG. 5, the rule defines that when a UserA prints out a document of two or more pages, the functions are limited to double-sided printing and monochrome printing, and PrinterA is to be used as the output destination. Furthermore, the rule defines that when ClientA prints a document including a confidential keyword, PrinterB is to be used as the output destination.

The data structure of the rule definition data 246 shown in FIG. 5 is one example. Various rules may be defined according to specific purposes. The rule definition data is further described as follows. The information of conditions that can be defined may include a user name and a client name as described above; unique user information such as a role, a group, and a right given to the user; and unique terminal information such as a MAC address, an IP address, and an IP address range. The information of conditions may further include the number of pages, whether there is a confidential keyword, print settings, and job content information. The print settings include color mode specification; a specification of single-sided printing or double-sided printing; a specification of stapling, hole punch, or stamping; specifications of sheet size and media type; specifications of sheet feeding direction, sheet feeding inlet, and sheet eject outlet; and a specification of print quality. The job content information includes a document name, job issuing time, and whether there is an individual name or a particular word.

The above described information items of conditions may be used alone or in combination as shown in FIG. 5. The above described unique terminal information and unique user information may be easily obtained as information associated with the login user when the transmission processing unit 240 is activated with the same right as that of the application. The unique terminal information and unique user information may be described in the print setting data 232.

The setting information that can be defined may include applying a restriction to double-sided printing, a restriction to monochrome mode, a restriction to the output destination, a restriction to ground tint printing, a restriction to adding stamps, a restriction to adding electronic watermarks, a warning of a confidential document, a restriction to combine printing of a predetermined layout, a notification of a change in the print setting, and confirmation of the change in the print setting. The setting information may be used alone or in combination, as shown in FIG. 5. A description is given of an example of controlling output conditions with the use of the information of conditions and setting information.

An example of changing the output contents with the use of unique user information is to set a rule of allowing color printing for the administrator, but restricting printing to monochrome printing for general users. An example of changing the output contents with the use of unique terminal information is to set a rule of allowing users who belong to a predetermined location to print a confidential document only if the confidential document belongs to the predetermined location. An example of changing the output contents with the use of print setting information is to set a rule that when color mode printing is specified, combined printing of 2 in 1 (2 pages combined into 1 page) is to be performed if there is more than a predetermined number of pages, and combined printing of 4 in 1 (4 pages combined into 1 page) is to be performed if there is more than another predetermined number of pages. An example of changing the output contents with the use of job contents is to set a rule to merge and output jobs or to perform double-sided printing when there is are a predetermined number of pages or more.

An example of selecting an output destination with the use of print setting information is to set a rule that when the color mode is specified, an output destination that is registered as being capable of color printing is selected. An example of selecting an output destination with the use of job contents is to set a rule that when there are more than a predetermined number of pages, an output destination that is registered as being capable of high-speed printing is selected.

FIGS. 6A through 6C illustrate other examples of data used for determining the output conditions by the output condition control unit 242 according to the present embodiment. The rule definition data shown in FIG. 6A is for defining conditions of a merge/output operation. In the rule definition data shown in FIG. 6A, conditions of the target document names are defined at [Condition3] and [Condition4], and corresponding processes are defined at [Setting3] and [Setting4]. At [Command], the above conditions and settings are associated with each other.

The example shown in FIG. 6A defines that when a job having a document name of doc_cover is detected, the job is backed up in a storage location indicated by BackuplocationA, and a transmission process is not performed. Furthermore, it is defined that when a job having a document name of doc_body is detected, the document named doc_cover backed up in the storage location indicated by BackuplocationA and the document named doc_body of the corresponding job, are merged together and transmitted to PrinterB. The conditions of document names may be expressed by regular expressions and pattern dictionaries, so that the conditions can be defined for document names having a particular pattern.

The conditions for merge/output shown in FIG. 6A are merely examples. Any other expression can be used to define the conditions for identifying jobs to be merged and conditions for triggering merge/output. For example, the condition for triggering merge/output may be when all documents that are to be merged are provided. Another condition for triggering merge/output may be when a particular document is detected, even when all documents to be merged are not yet provided.

The rule definition data shown in FIG. 6B is for defining a given keyword such as a confidential keyword. In FIG. 6B, a confidential keyword such as "confidential" or "for internal use only" is defined. The rule definition data may define individual names or character strings to be blotted out with ink. The confidential keyword or character string to be blotted out with ink may be extracted by accessing the work area 230 and analyzing the image data, as long as the image data is in a format for holding text such as EMF, PDF, and PostScript. Furthermore, character strings in the image data may be replaced. Examples of rules for determining the output conditions using character strings extracted in this manner are described as follows. One example is to perform ground tint printing if the image data includes a confidential keyword. Another example to replace information to be protected (such as an individual name) with a predetermined character string (such as ■ or x).

The information of conditions may also include an aggregate value that is aggregated based on job execution history held in the history data 248. FIG. 6C illustrates aggregate data. The aggregate data is generated by regularly or irregularly aggregating the history in the history data 248. The aggregate data shown in FIG. 6C includes aggregate values of the number of pages output by color printing and monochrome printing in the past month for each user. An example of a rule for determining the output conditions using aggregate values is to limit the function to monochrome printing when the number of color printouts per month of a particular user has exceeded an upper limit.

Referring back to FIG. 4, in step S405, the output condition control unit 242 determines whether the matching condition matches the above-described condition for merging jobs. In the present embodiment, when backup and merge are specified in the setting corresponding to the matching condition, the output condition control unit 242 determines that the matching condition matches a merge condition. In step S405, when the output condition control unit 242 determines that the matching condition does not match a merge condition (No in step S405), the process proceeds to step S406. In step S406, the output condition control unit 242 reports, to the data transmission unit 244, an output destination specified in the setting corresponding to the matching condition, as a response to the query. At this stage, the output destination and the output contents are determined. In an embodiment that uses the image processing unit 234, the image processing unit 234 can appropriately perform processes according to the print setting data 232 that has been rewritten, such as processes relevant to image imposition, printing size, margin, etc. Furthermore, at this stage, the user that has requested a printing operation, the color mode, and the number of printouts may be accumulated as history so that the history data 248 is updated.

In step S407, the data transmission unit 244 gives a print command according to the print setting data 232 that has been rewritten and contents of image data 236, to the printer driver 252 of the remote printer reported as the output destination. The printer driver 252 receives the print command, sends the output data to a port monitor, and causes a remote printer determined as the output destination to print out the image data. The instance of the transmission processing unit 240 receives a job completion report and ends the process at step S408. When the image processing unit 234 is used, the data transmission unit 244 waits until the image processing unit 234 ends the process, and then the data transmission unit 244 acquires output data from the work area 230 and sends it to the output destination. The image processing unit 234 includes a function for generating an image of a high order image format from the image included in the job data. The printer driver 252 is automatically acquired with the use of a plug and play function such as UPnP and Bonjour. Thus, if a page printer can be connected to the printer network 100 and perform plug and play, i.e., if the page printer can use an automatic driver transfer protocol, such that there is no need to use a page printer of a specific format of a specific manufacturer, the process can be performed without depending on a specific manufacturer.

Furthermore, in a Windows (registered trademark) system according to a particular embodiment, when the printer driver corresponding to the determined output destination has functions of page allocation and image imposition, and the image data does not require data conversion as in a case where the image data 236 is in an EMF format, the following is possible. That is, the data transmission unit 244 sets the print setting data 232 as a print setting structure DEVMODE, passes the image data of a high order image format in the work area 230 to a remote printer driver corresponding to the output destination, and causes the printer driver 252 to create RAW data.

In step S405, when the output condition control unit 242 determines that the matching condition matches a merge condition (Yes in step S405), the process proceeds to step S409. In step S409, the output condition control unit 242 determines whether merge is specified, i.e., whether the condition for triggering output has been satisfied. In step S409, when the output condition control unit 242 determines that the condition for triggering output has not been satisfied (No in step S409), the process proceeds to step S412. In step S412, the output condition control unit 242 backs up the print setting data and the image data of the corresponding job in a storage area specified as a backup destination. In step S413, the output condition control unit 242 reports to the data transmission unit 244 that there is no output destination, and the process ends at step S408.

In step S409, when the output condition control unit 242 determines that the condition for triggering output has been satisfied (Yes in step S409), the process proceeds to step S410. In step S410, the output condition control unit 242 reads the print setting data that has been backed up in a specified backup destination, rewrites the print setting data of the current job so that the image data of the backed up job is merged with the current job in a specified order, and moves the backed up image data to the work area 230. In step S411, the output condition control unit 242 reports, to the data transmission unit 244, the transmission destination specified in the setting corresponding to the matching condition. Accordingly, the output destination and the output contents are determined.

Next, in step S407, the data transmission unit 244 sends a print command in accordance with the print setting data 232 and contents of the image data 236 after the merging process, to the printer driver 252 of the remote printer reported as the output destination. The printer driver 252 receives the print command, sends the output data to a port monitor, and causes the remote printer determined as the output destination to print out the image data. Then, the instance of the transmission processing unit 240 receives a report that the job has ended and ends the process at step S408.

A process executed by the data processing apparatus 110 according to another embodiment is described with reference to FIGS. 3 and 7 through 10. In the process according to the embodiment described below, when there is a change in the output contents, a query is generated to ask whether the user approves of the change. It can be decided whether to generate a query to the user depending on particular purposes. Alternatively, an administrator of the data processing apparatus 110 may set whether to generate a query to the user depending on particular purposes, and define such a setting in the rule definition data. In the present embodiment, a query is generated to ask whether the user approves of the change; however, in another embodiment, results of changes in the output contents may be reported to the user without query.

Figure 7:
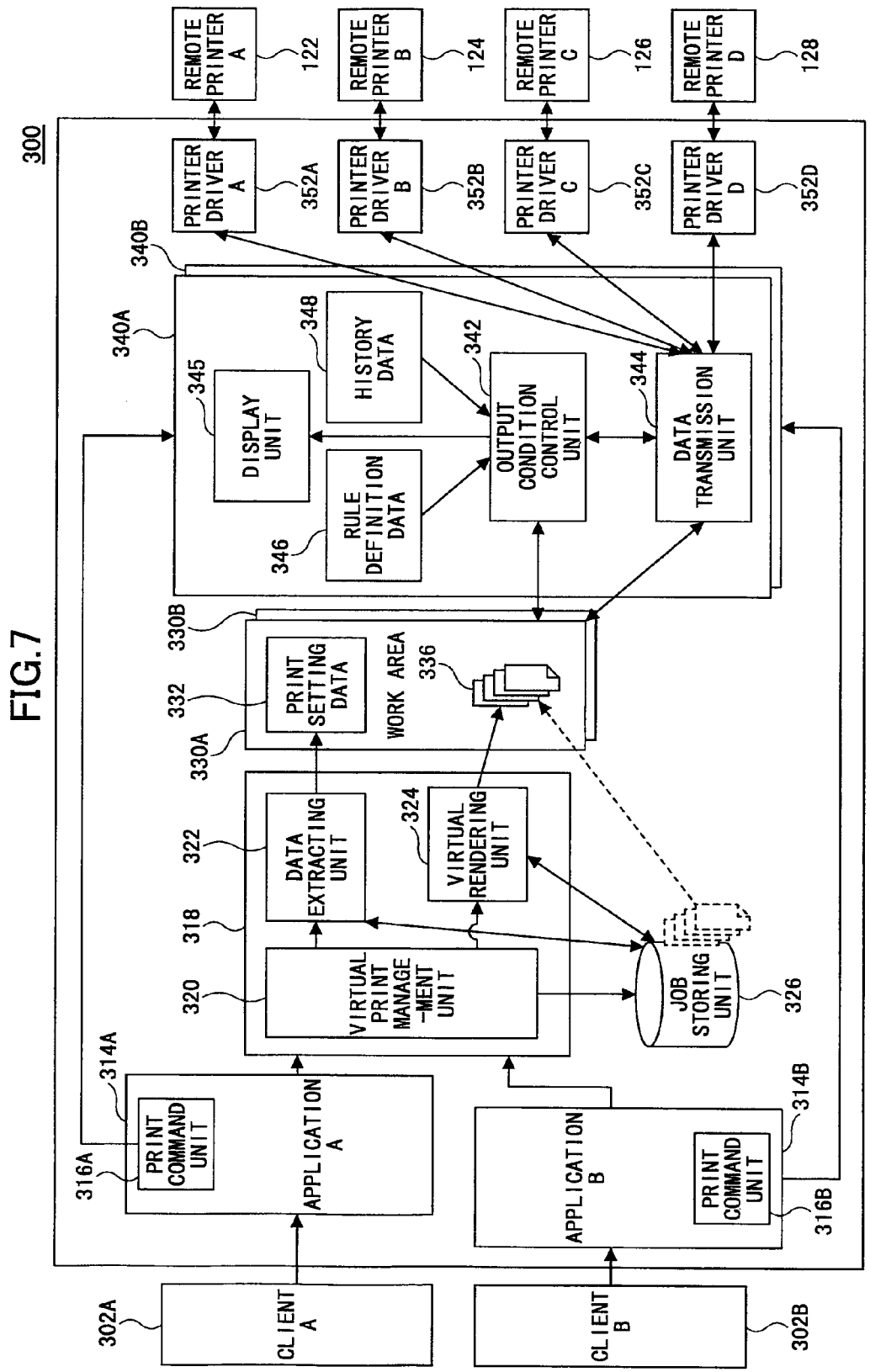
FIG. 7 is a functional block diagram of a data processing apparatus according to another embodiment of the present invention.

FIG. 7 is a functional block 300 of the data processing apparatus 110 according to the other embodiment. Among the function units shown in FIG. 7, those having the same functions as that shown in FIG. 2 are denoted by the same numerals in the last two digits. The functional block 300 has a similar configuration to the functional block 200 shown in FIG. 2, and therefore the following mainly describes the differences between FIGS. 2 and 7.

FIG. 7 illustrates the functional block 300 of the data processing apparatus 110 to which plural clients (client A 302A and client B 302B) are connected. Application A 314A and application B 314B operate in accordance with client A 302A and client B 302B, respectively. The application A 314A and the application B 314B have a print command unit 316A and a print command unit 316B, respectively. In response to a print request, the print command unit 316A and the print command unit 316B generate instances 340A, 340B of the transmission processing unit, with the use of the same rights of the application A 314A and the application B 314B, respectively. Furthermore, the print command unit 316A and the print command unit 316B also report process IDs for identifying jobs as well as the method for displaying the queries.

In the present embodiment, the generated instances 340A, 340B of the transmission processing unit each includes a display unit 345, in addition to a data transmission unit 344, an output condition control unit 342, a rule definition data 346, and a history data 348 described with reference to FIG. 2. When the output condition control unit 342 queries or sends a report to the user, the display unit 345 receives display contents from the output condition control unit 342. The display unit 345 performs a display process for the print request source (user) by the same method or right as that used for displaying contents to the print request source by the corresponding application 314. The display method means the method performed by the application 314 to display contents with the full right, on the display screen of the terminal operated by the print request source that has received the print command. In the present embodiment, the instance 340 of the transmission processing unit takes over the right of the application 314 for accomplishing the above configuration. As described above, in the present embodiment, the instance 340 of the transmission processing unit is generated by the same right of the application 314. Therefore, the instance 340 of the transmission processing unit can display contents by the same method and right by which the application 314 displays contents to the print request source. Accordingly, contents are correctly displayed to the print request source.

Meanwhile, a virtual printer driver 318 exclusively manages print requests from the applications 314 corresponding to the clients 302. For example, the virtual printer driver 318 first receives job data from the client A 302A, separates/extracts job information data and image data from the job data, moves image data 336 into a work area 330A or generates the image data 336 in the work area 330A, and generates the print setting data 332 in the work area 330A. When a similar print request is received from the client B 302B after completing the process for the client A 302A, the virtual printer driver 318 receives the job data from the client B 302B, moves or generates the image data in a work area 330B, and generates the print setting data 332 in the work area 330B. The data in the work areas 330A, 330B can be accessed by the corresponding instances 340A, 340B of the transmission processing unit, respectively. The instance 340A, 340B of the transmission processing unit that has been activated for each job determines the output conditions including the changes in the output contents and the selected output destination. When the output conditions have been determined, the instance 340A, 340B acquires data in the high order image format generated in the work area 330A, 330B, and sends a print command to a printer driver 352 corresponding to the determined output destination in accordance with contents of the print setting data.

Figure 8:
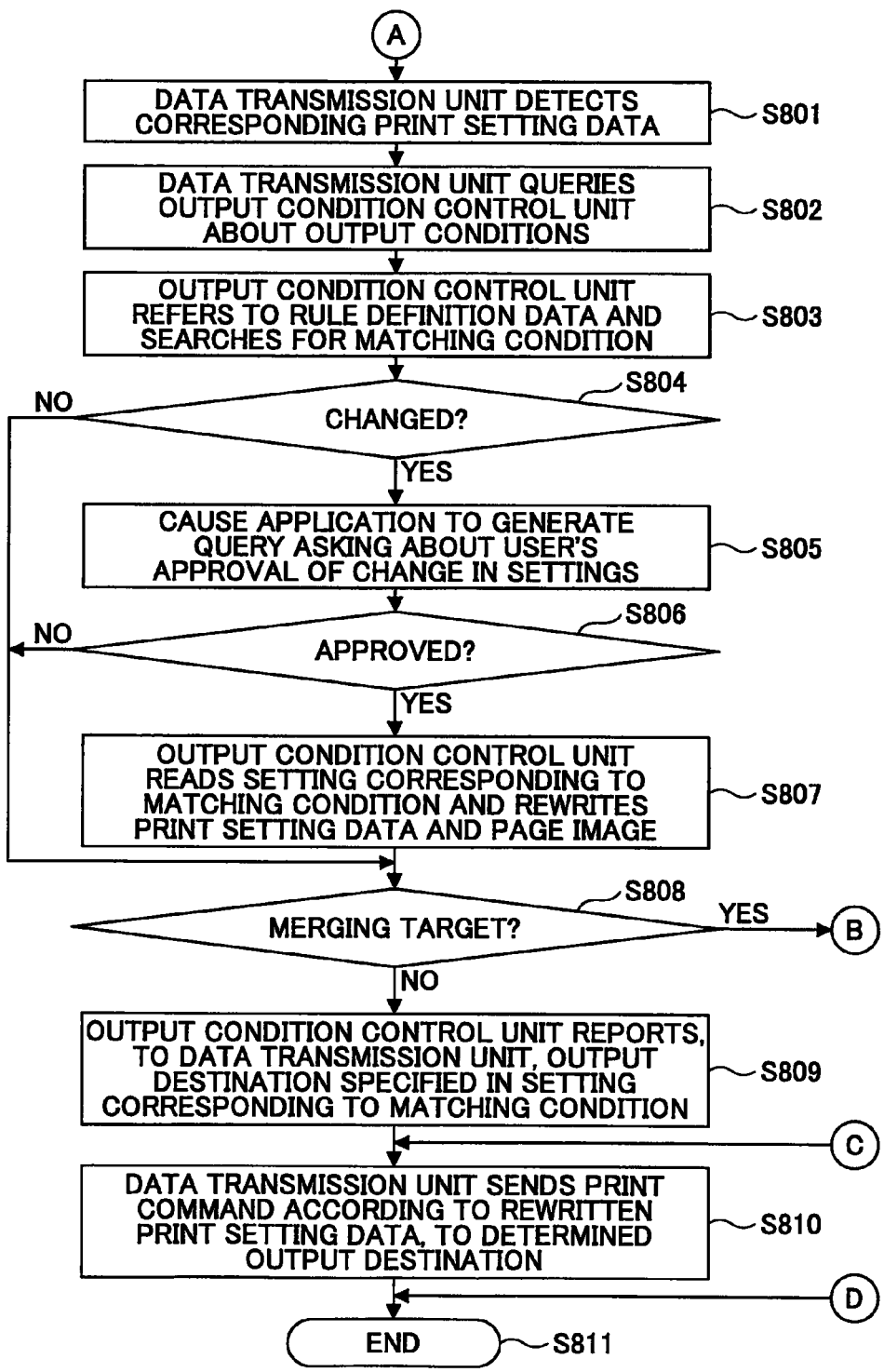
FIG. 8 is a flowchart (part 1) of a process performed by the data processing apparatus according to the other embodiment.

FIGS. 8 and 9 are flowcharts of a process performed by the data processing apparatus according to the other embodiment. The process up to point A in FIG. 8 is the same as that of FIG. 3, and is thus not further described. FIGS. 8 and 9 are connected by points B through D. After the same process as that of FIG. 3 is performed, the process proceeds through point A to step S801 of FIG. 8. In step S801 of FIG. 8, the data transmission unit 344 of the transmission processing unit activated in step S303 detects that print setting data identified with the process ID has been generated, and starts the transmission process.

In step S802, the data transmission unit 344 queries the output condition control unit 342 of the output conditions. In step S803, the output condition control unit 342 acquires the information of various conditions, refers to the rule definition data 346 to compare it with the information of various conditions, and searches for a matching condition. In step S804, the output condition control unit 342 determines whether there is a change in the print setting based on the setting corresponding to the matching condition. When the output condition control unit 342 determines that there is a change (Yes in step S804), the process proceeds to step S805. In step S805, the output condition control unit 342 passes, to the display unit 345, display contents for making a query to ask about a request for making a change in the print setting. Specifically, the output condition control unit 342 causes the application 314, which is the activation source, to generate a report that there is a request to make a change in the print setting and a query asking about the user's approval of the change, and causes the display unit 345 to display these contents.

FIGS. 10A through 10C illustrate GUI messages that are displayed on a screen page of the client in response to a user query made by the data processing apparatus. FIG. 10A illustrates a GUI message for suggesting to change the setting from color printing to monochrome printing. When a "YES" button or a "NO" button is clicked, the approval or disapproval is returned to the output condition control unit 342 via the display unit 345. After step S805, in step S806, the output condition control unit 342 determines whether the change has been approved. In step S806, when it is determined that the "YES" button has been clicked and the change has been approved, the process proceeds to step S807.

In step S807, the output condition control unit 342 rewrites the print setting data to the setting corresponding to the matching condition. Furthermore, when the setting corresponding to the matching condition includes a specification to change the contents of the image data, the output condition control unit 342 also changes the image data. Meanwhile, in step S804, when the output condition control unit 342 determines that there is no change (No in step S804), or in step S806, when the output condition control unit 342 determines that the change has not been approved (No in step S806), the process proceeds to step S808. In the present embodiment, when the output condition control unit 342 determines that the change has not been approved (No in step S806), the process proceeds without changing the output contents. However, in other embodiments, when the output condition control unit 342 determines that the change has not been approved (No in step S806), execution of all jobs may be cancelled, or a response when the change is not approved may be described in the rule definition data 346, and the output condition control unit 342 may determine whether to continue to execute the job or to cancel the job according to the rule.

In step S808, the output condition control unit 342 determines whether the matching condition matches the above-described condition for merging jobs. In step S808, when the output condition control unit 342 determines that the matching condition does not match a merge condition (No in step S808), the process proceeds to step S809. In step S809, the output condition control unit 342 reports, to the data transmission unit 344, an output destination specified in the setting corresponding to the matching condition. In step S810, the data transmission unit 344 appropriately performs processes relevant to image imposition, printing size, margin, etc., according to the print setting data that has been rewritten and the contents of the image data, and sends a print command to the printer driver 352 of the remote printer specified as the output destination. The printer driver 352 of the specified output destination receives the print command, sends the output data in the RAW format to a port monitor, and causes the remote printer specified as the output destination to print out the image data. Then, the data transmission unit 344 receives a job completion report and ends the process at step S811.

Meanwhile, in step S808, when the output condition control unit 342 determines that the matching condition matches a merge condition (Yes in step S808), the process proceeds through point B to step S901 in FIG. 9. In step S901, the output condition control unit 342 determines whether the condition for triggering output has been satisfied. In step S901, when the output condition control unit 342 determines that the condition for triggering output has not been satisfied (No in step S901), the process proceeds to step S905. In step S905, the output condition control unit 342 backs up the print setting data and the image data of the corresponding job in a storage area specified as a backup destination. In step S906, the output condition control unit 342 reports to the data transmission unit 344 that there is no output destination. In step S907, the output condition control unit 342 passes, to the display unit 345, display contents for reporting that the job currently being requested has been backed up as a merging target, and causes the application that is the activation source to generate a user report about the backup, via the display unit 345. FIG. 10B illustrates a GUI message for reporting that the document has been backed up. Then, the process proceeds through point D and ends at step S811 in FIG. 8.

Meanwhile, in step S901, when the output condition control unit 342 determines that the condition for triggering output has been satisfied (Yes in step S901), the process proceeds to step S902. In step S902, the output condition control unit 342 reads the print setting data backed up in the specified backup destination, rewrites the print setting data of the current job so that the backed up image data is merged with the current job in a specified order, and moves the backed up image data to the work area 330. In step S903, the output condition control unit 342 reports, to the data transmission unit 344, the transmission destination that is specified in the setting corresponding to the matching condition. Accordingly, the output destination and contents of the print setting data are determined. Next, in step S904, the output condition control unit 342 causes the application 314, which is the activation source, to generate a report via the display unit 345. Specifically, the report describes that the currently requested job is a merging target, the currently requested job will be merged with a backed up job, and the merged jobs will be output. FIG. 10C illustrates a GUI message for reporting that the documents have been merged. Then, the process proceeds through point C to step S810 of FIG. 8, where the data transmission unit 344 sends, as a job, output data including contents in accordance with the print setting data and the image data after the merging process, to the remote printer determined as the output destination. The data transmission unit 344 receives a job completion report and ends the process at step S811.

As described above, according to an embodiment of the present invention, a data processing apparatus and a recording medium are provided, which are capable of changing and determining the output destination as well as output contents and causing an image forming apparatus to output a pertinent image in accordance with conditions defined for information relevant to the user, the terminal, and the printing process, even in an environment including printers from different vendors.

Furthermore, according to an embodiment of the present invention, in a current network printing environment in which personal computers and thin clients can access plural image forming apparatuses, an image can be output from an appropriate printer by flexibly changing and limiting the job output destination and the output contents in accordance with defined rules relevant to information unique to the user, information unique to the terminal, print settings, and job contents. Accordingly, each output operation can be efficiently managed, and information security can be enhanced. Furthermore, according to an embodiment of the present invention, a data processing apparatus and a recording medium are provided, which are capable of controlling the output destination and output contents with minimum cost and without the need of adding an application module for an application server.

Furthermore, according to an embodiment of the present invention, a data processing apparatus and a recording medium are provided, which are capable of managing the output destinations used for printing by responding to flexible network configurations, without the need of adding a printer driver of a remote printer to a thin client.

Functions of an embodiment of the present invention may be implemented with an apparatus-executable program described in an object oriented programming language such as C, C++, C#, and Java (registered trademark). The program according to an embodiment of the present invention may be distributed in an apparatus-readable recording medium such as a hard disk device, a CD-ROM, an MO, a DVD, a flexible disk, an EEPROM, and an EPROM. The program according to an embodiment of the present invention may be transmitted via a network in a format readable by another apparatus.

According to an aspect of the present invention, the output destination and output contents can be changed and a print command can be sent to an appropriate output destination in accordance with a predetermined rule, and therefore the efficiency of operations in an office environment provided with plural output apparatuses can be enhanced.

According to an aspect of the present invention, the print contents may be changed by merging and outputting jobs that have been pre-registered as merging targets, and therefore the efficiency of operations in an office environment provided with plural output apparatuses can be further enhanced.

According to an aspect of the present invention, various changes may be made to various information items of a print job.

According to an aspect of the present invention, the information unique to a terminal may include a network address or the name of the terminal. The information unique to the user may include a user name, a group to which the user belongs, and the right given to the user. The print setting information may include a specification of color mode; a specification of single-sided printing or double-sided printing; a specification of stapling, hole punch, or stamping; a specification of the sheet size and type of medium; a specification of the sheet feeding direction, the sheet feeding inlet, and the sheet eject outlet; and a specification of print quality. The job information may include a document name, the job issue time, an individual name, and whether there is a particular keyword. The image data is preferably in a format that is common to various printers, and in a high order data format.

The present invention is not limited to the specific embodiments described herein, and variations and modifications may be made without departing from the scope of the present invention.

The present application is based on Japanese Priority Patent Application No. 2009-143161, filed on Jun. 16, 2009, the entire contents of which are hereby incorporated herein by reference.

What is claimed is:

1. An information processing apparatus that is connected with a plurality of output devices and that determines an output destination, from among the plurality of output devices, of print job data for a print job received from an application, the information processing apparatus comprising:
    a receiving unit that receives the print job data from the application;
    an extracting unit that extracts a plurality of print setting information items from the print job data;
    a print setting information storing unit that stores the plurality of print setting information items extracted by the extracting unit;
    a transmission processing unit that stores rule definition data including a change in output contents condition corresponding to at least one of the print setting information items, a change in output contents setting of changing an output content of the print job data corresponding to the change in output contents condition, and an output destination condition for determining a corresponding output destination for at least one of the print setting information items; and
    an output condition control unit that determines whether the change in output contents condition is satisfied by at least one of the print setting information items stored in the print setting information storing unit, and upon determining that the print setting information storing unit includes at least one print setting information item satisfying the change in output contents condition, changes an output content of the print job data based on the corresponding change in output contents setting, the output condition control unit further determining an output destination of the changed print job data based on at least one of the print setting information items stored in the print setting information storing unit satisfying the output destination condition.

2. The information processing apparatus according to claim 1, wherein
the change in output contents condition includes a condition for identifying the print job data as a merge-target to be merged with print job data of another print job and a condition for merging the merge-target,
the output condition control unit saves the print job data upon determining that the condition for identifying the print job data as a merge-target is satisfied by at least one of the print setting information items stored in the print setting information storing unit,
the output condition control unit creates merged print data by merging the saved print job data with the print job data of another print job determined to be a merge-target upon determining that the condition for merging the merge-target is satisfied, and
the output condition control unit determines an output destination of the merged print data.

3. The information processing apparatus according to claim 1, wherein the print setting information items include any one of information relevant to a user making a print instruction to the application, information relevant to a terminal for giving a print instruction to the application by the user, information relevant to a print setting of the print job data, and information relevant to a content of the print job data.

4. The information processing apparatus according to claim 1, wherein the change in output contents setting sets at least one function by changing the print setting information items, the at least one function selected from the group consisting of double-sided printing, monochrome printing, combined printing, ground tint printing, an electronic watermark, and confidential printing.

5. The information processing apparatus according to claim 1, further comprising:
a job execution history storage unit configured to store job execution history, wherein
the change in output contents condition includes a condition based on the job execution history.

6. The information processing apparatus according to claim 1, wherein upon determining that the change in output contents condition is satisfied, the output condition control unit reports information relevant to the change in output contents setting to the application.

7. The information processing apparatus according to claim 1, wherein an instance of the output condition control unit is generated for each print job, and the output condition control unit is activated with the same rights as the application.

8. The information processing apparatus according to claim 1, further comprising:
a virtual printer driver unit that generates, for each page of the print job data, image data based on the print job data, wherein the print setting information storing unit stores imposition information as one of the print setting information items, wherein
the output condition control unit changes the output content of the print job data by changing the image data and at least one of the print setting information items based on the change in output contents setting.

9. A non-transitory computer-readable recording medium storing a program that causes a computer to function as an information processing apparatus that is connected with a plurality of output devices and that determines an output destination, from among the plurality of output devices, of print job data for a print job received from an application, wherein the program causes the computer to execute a process comprising:
receiving the print job data from the application;
extracting a plurality of print setting information items from the print job data;
storing the plurality of print setting information items extracted from the print job data;
storing rule definition data including a change in output contents condition corresponding to at least one of the print setting information items, a change in output contents setting of changing an output content of the print job data corresponding to the change in output contents condition, and an output destination condition for determining a corresponding output destination for at least one of the print setting information items;
determining whether the change in output contents condition is satisfied by at least one of the print setting information items stored in the print setting information storing, and upon determining that the print setting information storing includes at least one print setting information item satisfying the change in output contents condition, changing an output content of the print job data based on the corresponding change in output contents setting; and
determining an output destination of the changed print job data based on at least one of the print setting information items stored in the print setting information storing satisfying the output destination condition.

10. The non-transitory computer-readable recording medium according to claim 9, further comprising:
identifying the print job data as a merge-target based on a condition included in the change in output contents condition for identifying the print job data as a merge-target to be merged with print job data of another print job;
saving the print job data upon determining that the condition for identifying the print job data as a merge-target is satisfied by at least one of the print setting information items stored in the print setting information storing;
creating merged print data by merging the saved print job data with the print job data of another print job determined to be a merge-target upon determining that a condition for merging the merge-target is satisfied; and
determining an output destination of the merged print data.

11. The non-transitory computer-readable recording medium according to claim 9, wherein the print setting information items include any one of information relevant to a user making a print instruction to the application, information relevant to a terminal for giving a print instruction to the application by the user, information relevant to a print setting of the print job data, and information relevant to a content of the print job data.

12. The non-transitory computer-readable recording medium according to claim 9, wherein the change in output contents setting sets at least one function by changing the print setting information items, the at least one function selected from the group consisting of double-sided printing, monochrome printing, combined printing, ground tint printing, an electronic watermark, and confidential printing.

13. The non-transitory computer-readable recording medium according to claim 9, further comprising:
   storing job execution history, wherein
      the change in output contents condition includes a condition based on the job execution history.

14. The non-transitory computer-readable recording medium according to claim 9, further comprising:
   reporting information relevant to the change in output contents setting to the application upon determining that the change in output contents condition is satisfied.

15. The non-transitory computer-readable recording medium according to claim 9, wherein an instance of the determining whether the change in output contents condition is satisfied is generated for each print job, and the determining is activated with the same rights as the application.

16. The non-transitory computer-readable recording medium according to claim 9, further comprising:
   generating, for each page of the print job data, image data based on the print job data; and
   storing imposition information as one of the print setting information items, wherein
   changing the output content of the print job data includes changing the image data and at least one of the print setting information items based on the change in output contents setting.

\* \* \* \* \*